UNITED STATES PATENT OFFICE.

SIDNEY TRIVICK, OF CLAPHAM, ENGLAND.

PROCESS OF EXTRACTING METALS FROM ORES.

SPECIFICATION forming part of Letters Patent No. 723,787, dated March 24, 1903.

Original application filed October 30, 1899, Serial No. 735,276. Divided and this application filed June 16, 1902. Serial No. 111,991. (No specimens.)

*To all whom it may concern:*

Be it known that I, SIDNEY TRIVICK, of No. 2 Lydon road, Clapham, in the county of Surrey, England, have invented a certain new and useful process whereby metals may be extracted from their ores by the gradual generation in the midst of the mass of the ore of the element chlorin in the nascent condition, so as to effect the chlorination of the metals, permitting them to be dissolved out of the ore; and I do hereby declare the following to be a full, clear, and exact description of the invention, such as will enable others skilled in the art to which it appertains to make and use the same.

The process consists in adding to the ore a quantity of chlorid of lime and such a quantity of metallic salt that in the presence of water the chemical reactions which occur will result in the production of a hypochlorite of the metal of the added salt in the presence of chlorid of that metal, these two substances tending to act on one another and produce a hydrate of the metal and liberate all the chlorin which is contained in each of them. The tendency of the hypochlorite and the chlorid to act on one another is comparatively feeble, except under the stimulating influence of substances which have an affinity for chlorin. When clean surfaces of such substances are presented to the before-mentioned chlorin-containing reagents, chlorin is liberated and in the nascent state will vigorously attack the metallic substances, whereas in the absence of those substances the generation of the chlorin is to a considerable extent held in abeyance, and consequently molecular chlorin gas will not be liable to be formed to any great extent. The water which is requisite for the operation may be added to the metalliferous mass of the ore preparatory to the introduction of the two reagents, or it may be added with the metallic salt, or it may be added after the chlorid of lime and the metallic salt have been intimately intermixed in the dry state with the ore. The clean surfaces of metallic substances requisite to invite the attack of the chlorin and promote the chemical action above described are provided on the finely-divided particles in a metalliferous mass of ore which is maintained in motion. The generation of the chlorin is accompanied by the precipitation of a metallic hydrate, which is swept off the surface by the movement.

Ores containing metals which are not in a condition to be susceptible to chlorination should undergo a preliminary roasting or other process which will render them amenable, the final result desired being the extraction of the metals by rendering them solvent.

As a representative example of how my process can be carried into effect and the proportions of the mixture which are requisite for this purpose, I will suppose that the condition of the chlorid of lime which is used is that of a good commercial quality, such as to contain an excess of calcium hydrate, the chlorin present being thirty-five per cent. of the whole, the composition being represented by the formula:

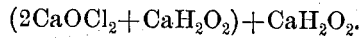

$$(2CaOCl_2 + CaH_2O_2) + CaH_2O_2.$$

The metallic salt used in the process I will suppose to be manganous chlorid of the commercial quality which is represented by $MnCl_2\ 4H_2O$. The first effect of the mixing of these two substances in the presence of water is the formation of manganous hydrate and monoxid of chlorin together with calcium chlorid. The two former react on one another and produce manganous hypochlorite, though there will be an excess of manganous hydrate. The manganous hypochlorite in the presence of an excess of manganous chlorid which is originally added will tend to act on one another and cause the formation of nascent chlorin, as previously described. For the complete reaction the relative quantities of chlorid of lime and manganous chlorid requisite will be thirty-four and sixty-six per cent., or one-third and two-thirds, respectively, one chemical unit of the former being wanted for four units of the latter.

Unless there is sufficient manganous chlorid present, as above defined, both locally and in total chlorin gas will be freely and rapidly evolved and be mostly wasted.

As an alternative to manganous chlorid one of many other metallic salts may be used. As an example of a salt which is not a chlorid I will select ferric sulfate and explain how by its intermixture with chlorid of lime in the presence of water a hypochlorite of the metal, together with a chlorid, are derived, which are able by contact with metallic substances to evolve nascent chlorin. In this case the first effect is an interchange of the iron and calcium, resulting in the formation of calcium sulfate and ferric chlorid, and thus the chlorid of the metal is provided. Ferric hydrate and monoxid of chlorin are also produced, which together form ferric hypochlorite. This latter and the ferric chlorid are then ready to evolve nascent chlorin when brought into contact with metallic or other substances which have an affinity for chlorin.

Supposing the composition of the chlorid of lime to be as before defined and that the composition of the ferric sulfate may be represented by $Fe_2(SO_4)_3$, the percentage proportions of the former to the latter requisite to complete the reaction will be forty-seven to fifty-three, inasmuch as three chemical units of chlorid of lime will be required per four units of ferric sulfate.

I claim—

1. A process for evolving nascent chlorin and effecting the chlorination of metallic substances in order that they may be extracted from a metalliferous mass by rendering them solvent consisting in adding to the mass a mixture in definite proportions of two substances, one being dry chlorid of lime and the other a metallic salt, the proportions being such as to result in the formation of a hypochlorite of the metal of the added salt and a chlorid of that metal which will evolve nascent chlorin.

2. A process for evolving nascent chlorin and effecting the chlorination of metallic substances in order that they may be extracted from a metalliferous mass by rendering them solvent consisting in adding to the mass a mixture in definite proportions of two substances, one being dry chlorid of lime and the other a ferric salt, the proportions being such as to result in the formation of ferric hypochlorite and ferric chlorid which will evolve nascent chlorin.

3. A process for evolving nascent chlorin and effecting the chlorination of metallic substances in order that they may be extracted from a metalliferous mass by rendering them solvent consisting in adding to the mass a mixture in definite proportions of two substances, one being dry chlorid of lime and the other ferric sulfate, the proportions being such as to result in the formation of ferric hypochlorite and ferric chlorid which will evolve nascent chlorin.

In witness whereof I have hereunto set my hand in the presence of two witnesses.

SIDNEY TRIVICK.

Witnesses:
ROBT. A. BLAKE,
WALTER J. SKERTEN.